United States Patent [19]
Rinkewich

[11] Patent Number: 4,569,369
[45] Date of Patent: Feb. 11, 1986

[54] TIMER-CONTROLLED VALVE PARTICULARLY FOR IRRIGATION

[76] Inventor: Isaac Rinkewich, 12 Fishman Maimon St., Tel-Aviv, Israel

[21] Appl. No.: 594,870

[22] Filed: Mar. 29, 1984

[30] Foreign Application Priority Data

Nov. 25, 1983 [IL] Israel ............................................ 70329

[51] Int. Cl.⁴ ............................................ F16K 21/10
[52] U.S. Cl. ............................. 137/624.12; 251/23; 251/20; 251/54
[58] Field of Search ............... 137/624.1, 624.12; 251/49, 51, 54, 55, 20, 23, 15, 66, 67, 74

[56] References Cited

U.S. PATENT DOCUMENTS

| | | | |
|---|---|---|---|
| 769,521 | 9/1904 | Walter | 251/49 |
| 2,599,151 | 6/1952 | Baldwin | 251/49 X |
| 3,291,154 | 12/1966 | Bounds | 251/51 X |
| 3,315,701 | 4/1967 | Stilwell | 251/54 X |

*Primary Examiner*—Alan Cohan
*Attorney, Agent, or Firm*—Benjamin J. Barish

[57] ABSTRACT

A timer-controlled valve comprises a valve member movable from a home position to an actuated position with respect to a passageway in the valve housing, an operator manually movable from a home position to a plurality of preselected actuated positions to preselect a predetermined time interval, the operator being coupled to the valve member so that the latter moves therewith, and a dashpot device for returning the operator from its preselected actuated position to its home position after the elapse of a predetermined time interval, the valve member also being returned to its home position with the operator.

9 Claims, 3 Drawing Figures

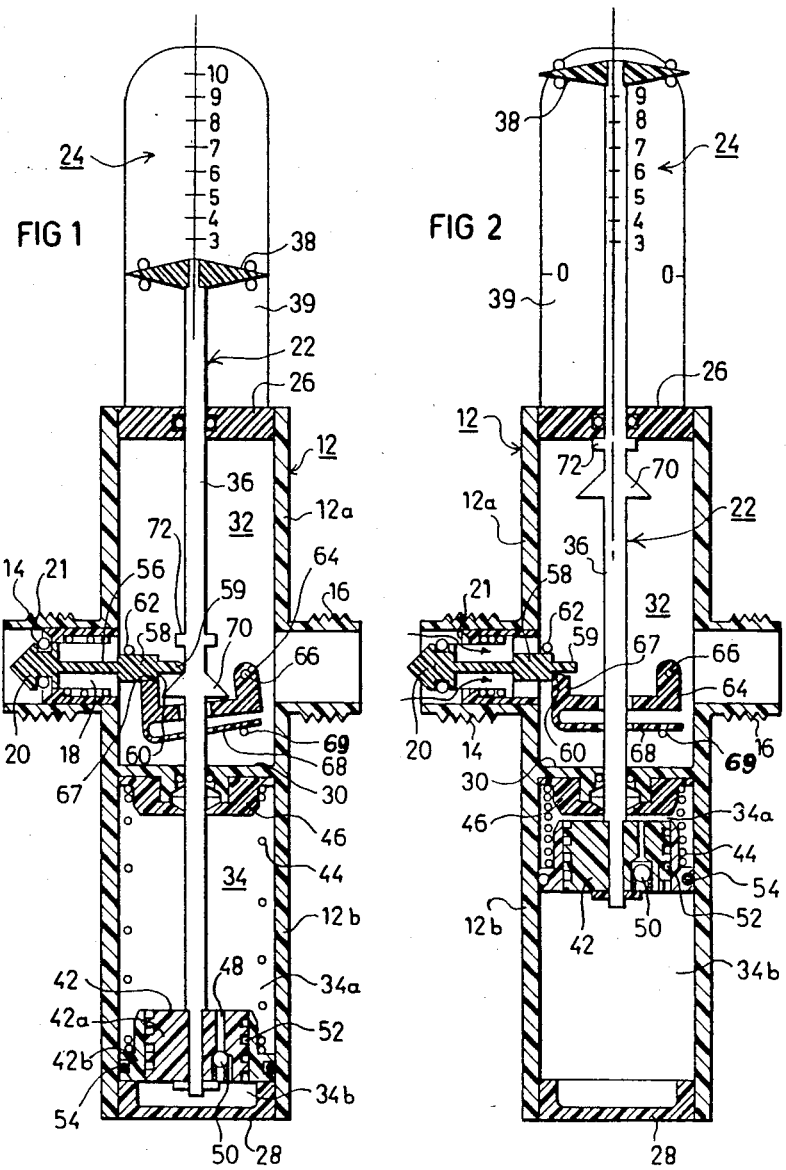
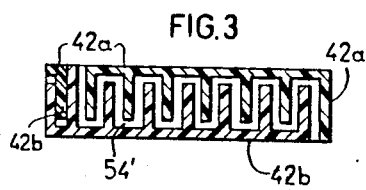

TIMER-CONTROLLED VALVE PARTICULARLY FOR IRRIGATION

BACKGROUND OF THE INVENTION

The present invention relates to timer-controlled valves, such as are used for controlling the flow of a fluid for predetermined time intervals. The invention is particularly useful in timer-controlled valves for controlling the flow of water in a water irrigation system, and is therefore described below particularly with respect to this application.

A number of timer-controlled valves have been developed and are now in use for controlling the supply of irrigation water for predetermined time intervals. However, efforts are continuously being made to simplify the construction of such timer-controlled valves, lower their cost, and improve their reliability.

SUMMARY OF THE INVENTION

An object of the present invention is to provide a novel timer-controlled valve which has advantages in the above respects.

According to the present invention, there is provided a timer-controlled valve for controlling the flow of a fluid, comprising: a housing including an inlet for the fluid, an outlet for the fluid, and a passageway connecting the inlet to the outlet; a valve member normally biassed during the operation of the valve to a closed position but movable to an open position with respect to the passageway, to control the flow of the fluid therethrough from the inlet to the outlet; and an operator member manually movable from a home position to one of a plurality of preselected actuated positions to preselect a predetermined time interval. The valve further includes first cam means fixed to the operator member and engageable with the valve member such that moving the operator member from its home position to a preselected actuated position moves the valve member from its closed position to its open position; and a latch normally biassed to engage the valve member and to latch same in its open position, but movable by the operator member, when the latter is moved from its home position to a preselected actuated position, to disengage the valve member and thereby to permit it to move to its closed position. A dashpot device is provided for returning the operator member from its preselected actuated position to its home position after the elapse of a predetermined time interval depending on the preselected actuated position to which the operator member has been moved. The operator member carries second cam means engageable with the latch when the operator member has returned to its home position to cause the latch to disengage the valve member and thereby to permit it to move to its closed position.

In a described preferred embodiment, the operator member comprises a handle at one end, and a plunger at its opposite end movable within a liquid filled cylinder, the first and second cam means comprising different faces of a cam member secured to the operator member at an intermediate portion thereof. In the described preferred embodiments, the operator includes a rod longitudinally movable in one direction to any one of a plurality of preselectable actuated positions, which rod is returned by the dashpot device in the opposite direction to its home position.

Further features and advantages of the invention will be apparent from the description below.

BRIEF DESCRIPTION OF THE DRAWINGS

The invention is herein described, by way of example only, with reference to the accompanying drawings, wherein:

FIG. 1 is a longitudinal sectional view illustrating one form of timer-controlled valve constructed in accordance with the present invention, the parts being shown in the valve-closed condition;

FIG. 2 is a view corresponding to that of FIG. 1, but showing the parts in the valve-open condition;

FIG. 3 is a fragmentary view illustrating a modification in the construction of the valve of FIGS. 1 and 2;

The timer-controlled valve illustrated in FIGS. 1 and 2 is particularly useful for controlling the flow of water from an irrigating-water supply system according to a number of preselectable time intervals. The valve comprises a housing, generally designated 12, including an inlet 14 for the water supply, an outlet 16, a passageway 18 connecting the inlet to the outlet, and a valve member 20 movable either to a home position (FIG. 1) against the valve seat 21, or to an actuated position away from the valve seat (FIG. 2), to control the flow of the water from the inlet to the outlet.

The illustrated valve further includes an operator, generally designated 22, which is also movable from a home position (FIG. 1) to any one of a number of preselected actuated positions, indicated at 24, to preselect a predetermined time interval. The preselected time intervals shown in FIGS. 1 and 2 range from "3" to "10", each graduation indicating a predetermined number (e.g. 10) minutes of time; FIG. 2 illustrates the operator 22 in its actuated position for selecting the maximum (10) time interval.

The main portion of valve housing 12 is of cylindrical shape. It includes a pair of removable end walls 26, 28, closing its opposite ends, and an intermediate partition wall 30 integral with the housing. Wall 30 divides the housing into two generally cylindrical sections 12a, 12b, defining two compartments, namely, an upper compartment 32 which communicates with the inlet 14 and outlet 16, and a separate lower compartment 34 isolated from the inlet and outlet. The latter compartment is part of a dashpot device and is filled with another liquid, such as oil.

Operator 22 comprises a rod 36 extending longitudinally through housing 12 and projecting through an opening formed centrally of its end wall 26. The external end of rod 36 carries a handle 38 graspable by the user to enable him to pull out the rod and thereby to select one of the time intervals indicated at 24. The graduation markings designating these time intervals are provided on a plate 39 attached to housing 12.

Rod 36 of operator 22 also extends through an opening centrally of partition wall 30 and carries, at its end opposite to handle 38, a plunger 42 movable within dashpot compartment 34. Plunger 42 thus divides compartment 34 into two chambers: namely, chamber 34a on the side facing partition wall 30, and chamber 34b on the side facing end wall 28. A coil spring 44 is interposed between plunger 42 and an apertured sealing disc 46 pressed by spring 44 against internal wall 30, and enhancing the seal between the latter wall and rod 36 passing through.

Dashpot plunger 42 is provided with two passageways therethrough to permit the fluid to flow between the two compartments 34a, 34b on its opposite sides. One passageway 48 is of relatively large cross-section and is occupied by a one-way ball-valve 50 which permits the liquid to flow at a high rate through the plunger from chamber 34a to chamber 34b when rod 36 is lifted upwardly to preset a preselected time interval; however, valve 50 blocks the flow through passageway 48 when rod 22 is moved in the opposite direction, i.e. contracting chamber 34b. The second passageway 52 permits but a low-rate liquid flow from chamber 34b to chamber 34a when rod 36 is moved by spring 44 to contract chamber 34b.

For producing this low-flow-rate passageway 52, plunger 42 is constituted of a central core 42a enclosed within an annular sleeve 42b. The outer face of the core is formed with a spirally-extending groove 52 to define a low-flow-rate spiral passageway. The outer sleeve 42b of plunger 42 carries a sealing ring 54 sealing the plunger with respect to the dashpot section 12b of housing 12 within which the plunger moves, thereby forcing the liquid to flow either through the high-flow-rate passageway 48 when the plunger is manually lifted, or through the low-flow-rate passageway 52 when the plunger is returned by spring 44.

Valve member 20 includes a rearwardly-extending stem 56 which is enlarged at an intermediate portion 58, and is again reduced at its rear end 59 to define an annular shoulder 60. Housing 12 carries one or more fixed pins 62 engageable with the enlarged portion 58 of the valve stem to guide the valve during its movement to its closed position (FIG. 1) or to its open position (FIG. 2).

Housing 12 also pivotably mounts a latching member 64 which is co-operable with shoulder 60 of valve stem 56 to latch the valve in its open position, as shown in FIG. 2.

Latching member 64 is pivotally mounted at one end at 66, and the opposite end serves as a latch element 67 engageable with shoulder 60. Latching member 64 is further formed with a leaf spring 68 engageable with another pin 69 fixed within housing 12 for urging the latching member to its latching position as illustrated in FIG. 2. Both the latching member 64 and its leaf spring 68 are formed with aligned openings through which passes rod 36 of the operator 22.

Rod 36 is formed with, or has attached to it, a conically-shaped cam 70. The upper surface of cam 70 serves as first cam means which is co-operable with the end 59 of valve stem 56 to move the valve member 20 to its open position (FIG. 2) when rod 36 is pulled upwardly to preselect a time interval 24; and the lower surface of cam 70 serves as a second cam means engageable with latching member 64 when rod 36 is returned to its home position, to cause the latching member to disengage valve member 20 and thereby to permit the valve member to move to its closed position. Rod 36 is further formed with a pair of projections 72 serving as stops engageable with end wall 26 to limit the outward position of rod 36 and thereby the maximum time interval it is capable of selecting.

The timer-controlled valve illustrated in FIGS. 1 and 2 operates as follows, starting with the valve-closed condition (FIG. 1), wherein the valve member 20 would be urged firmly against the valve seat 21 by the water pressure. In this condition, rod 26 of the valve operator 22 is in its lower position with its cam 70 underlying the rear end of valve stem 56, and with dashpot plunger 42 at the lower end of the cylinder 12b of housing 12.

When it is desired to open valve member 20 for a predetermined time interval, handle 38 of operator 22 is pulled upwardly to the graduation marking 24 designating the selected time interval. In FIG. 2, the selected time interval is the maximum (10), e.g. 200 minutes; thus handle 38 has been pulled upwardly to its maximum position wherein stops 72 of the operator rod 36 limit against the inner face of end wall 26. At the beginning of the upward movement of rod 36, its cam 70 engages the end 59 of valve stem 56 and moves valve member 20 to its open position, as illustrated in FIG. 2, wherein it is latched by latch member 64 which is pivoted clockwise under the influence of its leaf spring 68. Thus, valve member 20, latched in the valve-open position as illustrated in FIG. 2, permits the water to flow from the inlet 14 via the outlet 16 to a water irrigation device, such as a sprinkler or other device downstream of the timer-controlled valve.

During the upward movement of rod 36 for opening the valve and for preselecting the time interval during which it is to remain open, plunger 42 is also moved upwardly with the rod 36, thereby loading spring 44. This upward movement of rod 36 is permitted by one-way valve 50 which enables the oil in chamber 34a to flow at a high rate to chamber 34b during this contraction of chamber 34a and expansion of chamber 34b.

After the valve member 20 has been moved to its open position by the manual raising of rod 36, loaded spring 44 applies a force tending to move dashpot plunger 42 downwardly to contract chamber 34b. However, valve 50 blocks the flow of the oil through the high-flow-rate passageway 48, thereby constraining the liquid to flow through the low-flow-rate spiral passageway 52. Thus, return spring 44 will return plunger 42 downwardly at a slow rate, as determined by the flow of the oil through the spiral passageway 52.

At the end of the preselected time interval, cam 70 will have moved downwardly until it engages latch member 64, which then pivots to disengage its latch element 67 from shoulder 60 of valve stem 56, thereby releasing valve member 20. As soon as this occurs, the water pressure closes the valve member against its valve seat 21, thereby terminating the further water flow through the outlet 16.

Since the lower movement of rod 36 under the influence of spring 44 is at a slow linear rate, determined by the rate of flow of the liquid through the low-flow-rate spiral passageway 52, it will be appreciated that the further rod 36 is pulled outwardly, the longer will be the time interval before the valve is automatically closed. Accordingly, the desired time interval may be selected by the extent to which rod 36 is pulled outwardly.

FIG. 3 illustrates a modification that may be used for the low-flow-rate passageway 52 through the dashpot plunger 42. Thus, instead of making this low-flow rate passageway of spiral configuration, it could be also of a labyrinth configuration, as shown at 52' in FIG. 3. This labyrinth configuration may be conveniently produced by forming ribs on the outer face of plunger core 42a to interlock with the ribs on ring 42b to form the labyrinth configuration 52' illustrated in FIG. 3, rather than the spiral configuration described above. pg,11

Many other variations, modifications, and applications of the invention will be apparent.

What is claimed is:

1. A timer-controlled valve for controlling the flow of a fluid, comprising:

a housing including an inlet for said fluid, an outlet for said fluid, and a passageway connecting said inlet to said outlet;

a valve member normally biassed during the operation of the valve to a closed position but movable to an open position with respect to said passageway, to control the flow of the fluid therethrough from the inlet to the outlet;

an operator member manually movable from a home position to one of a plurality of preselected actuated positions to preselect a predetermined time interval;

first cam means fixed to said operator member and engageable with said valve member such that moving the operator member from its home position to a preselected actuated position moves the valve member from its closed position to its open position;

a latch normally biassed to engage said valve member and to latch same in its open position, but movable by said operator member, when the latter is moved from its home position to a preselected actuated position, to disengage said valve member and thereby to permit the valve member to move to its closed position;

a dashpot device for returning said operator member from its preselected actuated position to its home position after the elapse of a predetermined time interval depending on the preselected actuated position to which the operator member has been moved; and second cam means carried by said operator member engageable with said latch when the operator member has returned to its home position to cause said latch to disengage said valve member and thereby to permit said valve member to move to its closed position.

2. The timer-controlled valve according to claim 1, wherein said operator member includes a rod longitudinally movable in one direction to any one of a plurality of preselectable actuated positions, which rod is returned by said dashpot device in the opposite direction to its home position.

3. The timer-controlled valve according to claim 1, wherein said operator member comprises a handle at one end, and a plunger at its opposite end movable within a liquid-filled cylinder, said first and second cam means comprising different faces of a cam member secured to said operator member at an intermediate portion thereof.

4. The timer-controlled valve according to claim 3, wherein said plunger defines two liquid-filled chambers on the opposite sides thereof, one of said chambers including a spring urging the plunger to the home position of the operator.

5. The timer-controlled valve according to claim 4, wherein said plunger includes a high-rate path having a one-way valve permitting the liquid to flow at a high rate therethrough from one chamber to the other while the operator is being moved to its preselected actuated position, and a restricted path permitting the liquid to flow at a low rate therethrough from said other chamber back to said one chamber while the operator member is being moved toward its home position by said spring.

6. The timer-controlled valve according to claim 5, wherein said plunger includes an inner core and an outer sleeve enclosing said core, the confronting faces of said core and sleeve defining a spiral groove constituting said restricted path.

7. The timer-controlled valve according to claim 5, wherein said plunger includes an inner core and an outer sleeve enclosing said core, the interlocking faces of said core and sleeve defining a labyrinth groove constituting said restricted path.

8. The timer-controlled valve according to claim 1, wherein said latch includes a pivotal mounting at one end, a latching element at the opposite end, and a leaf spring normally urging the latching element into latching position with respect to the valve member.

9. The timer-controlled valve according to claim 8, wherein said latching element and leaf spring include aligned openings through which the operator passes.

* * * * *